United States Patent
Colpaert et al.

(10) Patent No.: US 7,350,929 B2
(45) Date of Patent: Apr. 1, 2008

(54) METHOD FOR CONTROLLING A LIGHTING DEVICE

(75) Inventors: Chris Colpaert, Lovendegem (BE); Peter Gerets, Roeselare (BE)

(73) Assignee: Barco, Naamloze Vennootschap, Kortrijk (BE)

( * ) Notice: Subject to any disclaimer, the term of this patent is extended or adjusted under 35 U.S.C. 154(b) by 130 days.

(21) Appl. No.: 11/270,440

(22) Filed: Nov. 10, 2005

(65) Prior Publication Data
US 2006/0192923 A1    Aug. 31, 2006

Related U.S. Application Data

(60) Provisional application No. 60/636,859, filed on Dec. 20, 2004.

(51) Int. Cl.
| | |
|---|---|
| G03B 21/14 | (2006.01) |
| G03B 21/26 | (2006.01) |
| G03B 21/28 | (2006.01) |
| H04N 9/12 | (2006.01) |
| H04N 5/74 | (2006.01) |
| G02B 5/28 | (2006.01) |
| G02B 27/14 | (2006.01) |
| G09G 3/36 | (2006.01) |
| F21V 9/00 | (2006.01) |

(52) U.S. Cl. .................. 353/84; 353/31; 353/37; 348/743; 348/771; 359/589; 359/634; 345/32; 345/88; 362/293

(58) Field of Classification Search ............ 353/84, 353/31, 37; 348/739, 742–744, 759, 760, 348/771; 349/5, 7; 359/577, 583, 589, 618, 359/629, 634; 345/22, 32, 84, 88, 690; 362/293
See application file for complete search history.

(56) References Cited

U.S. PATENT DOCUMENTS 6,310,591 B1 * 10/2001 Morgan et al. ............ 345/84
2002/0122019 A1    9/2002 Baba et al.

FOREIGN PATENT DOCUMENTS

| EP | 0 981 127 A1 | 2/2000 |
|---|---|---|
| WO | WO 01/69941 A2 | 9/2001 |

* cited by examiner

Primary Examiner—Rochelle Blackman
(74) Attorney, Agent, or Firm—Bacon & Thomas, PLLC

(57) ABSTRACT

A method for controlling a lighting device that consists of at least a lighting source, a color sequential device and a single light valve consisting of an array of light processing elements that are controlled by bits, the method comprising the steps of emitting a light beam with said light source, filtering said light beam by said color sequential device to achieve a colored light beam and processing said colored light beam with a bit depth of less than 16.

5 Claims, 1 Drawing Sheet

METHOD FOR CONTROLLING A LIGHTING DEVICE

CROSS-REFERENCES TO RELATED APPLICATIONS

This application is related to provisional Patent Application Ser. No. 60/636,859, filed on Dec. 20, 2004.

BACKGROUND OF THE INVENTION

1. Field of the Invention

The present invention relates to a method for controlling a lighting device, in particular a lighting device that is meant to be swung around when in use, for moving the projected image on a screen, wall or such.

2. Discussion of the Related Art

Lighting devices are known comprising a light source and a mechanical light valve consisting of a rotatable wheel containing several so called gobo's that can be placed in front of the light source.

A gobo is hereby generally defined as a plate of metal or the like, arranged with a number of holes in it or with a figure curved out of it.

The gobo placed in front of the light source hereby blocks part of the light beam emitted by the light source, while the rest of the light beam passes through the holes or the curved out figure, and is projected to a screen forming an image in the shape of said holes or figure.

In order to change the image projected by the above described lighting device, one can rotate the wheel containing the gobo's until another gobo is situated in front of the lighting source.

An inconvenience of the present device and method is that the number of gobo's that can be provided in the wheel is very limited—usually about twelve—thereby limiting the visual effects that can be attained by said known lighting device.

In order to overcome said inconvenience, it is known to replace the mechanical light valve by a digital light valve, comprising an array of light processing elements. A common used example of such digital light valve is a digital micro-mirrors device or DMD that is generally known as an array of individual micro-mirrors reflecting the light beam emitted by the light source on a lens where through it is projected on the screen, whereby each mirror corresponds to a pixel of the image to be built and can be switched individually between a position wherein the beam is reflected towards the lens and a position wherein the light beam is reflected away from the lens. So when a mirror is positioned in an on-screen position, the corresponding pixel on the screen is lit up, whereas when the mirror is positioned in an off-screen position, the corresponding pixel remains unlit.

Since the position of every mirror can be controlled individually by a programmable stream of bits, the use of the DMD allows a nearly unlimited combination of images to be created and projected.

In a specific known embodiment, a color sequential device is provided in between the light source and the digital light valve, such color sequential device consisting of a color disc comprising a red, a green and a blue filter section, or rotating prisms.

When said color sequential device is rotated in front of the lighting source, the light beam emitted by this last will subsequently change of color before being processed by the light valve.

Since the shifting of the colors appears faster than the time of the human perception of vision, the human eye sees a full colored image, being the average of the subsequently projected color beams.

Indeed, each pixel of the image projected on the screen is composed of three subsequently reflected color beams, whereby each color beam is projected for a certain time. During this time each mirror can shift several times between an on-screen and an off-screen position, so that only part of the color beam used for one color of a pixel reaches the screen.

The more time a specific mirror is positioned in an on-screen position, the brighter the color will appear on the corresponding pixel.

The shifting of the mirrors is hereby controlled by a sequence of bits, each bit having two possible values, namely 0 and 1 each corresponding to respectively the off-screen and the on-screen position of a mirror. The number of bits present in a bit sequence used to control a mirror while reflecting a beam of a specific color is hereby proportional to the times that the mirror can shift during the time one single color of the image is projected. It is clear that the more bits used to program the shifting, the more variations in color can be reached.

Said number of bits used to control the position of a single mirror during the processing of one single color of an image is generally known as the bit depth.

Presently it is common in the art of projecting images to use a bit depth of 16 to create nice looking colored images.

Another important quality parameter in the projection of moving images is the refresh rate, which is inversely proportional to the time it takes to project an entire image on the screen, more exactly the sum of the times each of the color filters red, green and blue are situated subsequently in front of the light source.

The refresh rate should hereby be faster than the human perception of vision, since otherwise the moving image will not be experienced as moving in a smooth continuous manner.

The refresh time of an image now seems to be the most important drawback of the known lighting devices comprising a digital light valve.

Indeed, in the above described lighting devices with a bit depth of 16, the refresh rate is about twice the time of human perception of vision, which is not enough when the lighting device is swung around, since in that case a color break up occurs that is due to the fact that the different colors of an image do not perfectly overlay anymore.

SUMMARY OF THE INVENTION

In order to overcome this color break up, the time between the shifting of the colors and thus the time of rotating the color sequential device and the time of processing the colored beams by the mirrors should be reduced, which is exactly the aim of the present invention.

In order to achieve said aim, the present invention relates to a method for controlling a lighting device that consists of at least a lighting source, a color sequential device and a single light valve consisting of an array of light processing elements that are controlled by bits, the method comprising the steps of emitting a light beam with said light source, filtering said light beam by said color sequential device to achieve a colored light beam and processing said colored light beam with a bit depth of less than 16.

Preferably the bit depth is equal to twelve.

The advantage of the method according to the invention is that the use of a bit depth of less than 16 and preferably 12 allows to reduce the time of building an image in a sufficient way as to increase the image refresh rate and to sufficiently reduce the color break up when swinging the lighting device, without visually decreasing the image quality.

Indeed, research has shown that decreasing the bit depth from 16 to 12 allows to decrease the time needed to process the light by the light processing elements in order to reach a refresh rate that is at least the triple of human perception of vision, without losing the color quality in a way that can be detected by an average human observer.

Furthermore, the applicant noticed that the reached refresh rate is sufficiently limiting the color break up in order to hide it for the human eye.

BRIEF DESCRIPTION OF THE DRAWINGS

In order to better explain the characteristics of the invention, the following preferred method according to the invention, for controlling a lighting device that is meant to be swung during use, is described as an example only without being limitative in any way, with reference to the accompanying drawings, in which.

DESCRIPTION OF A PREFERRED EMBODIMENT

Figure 1:
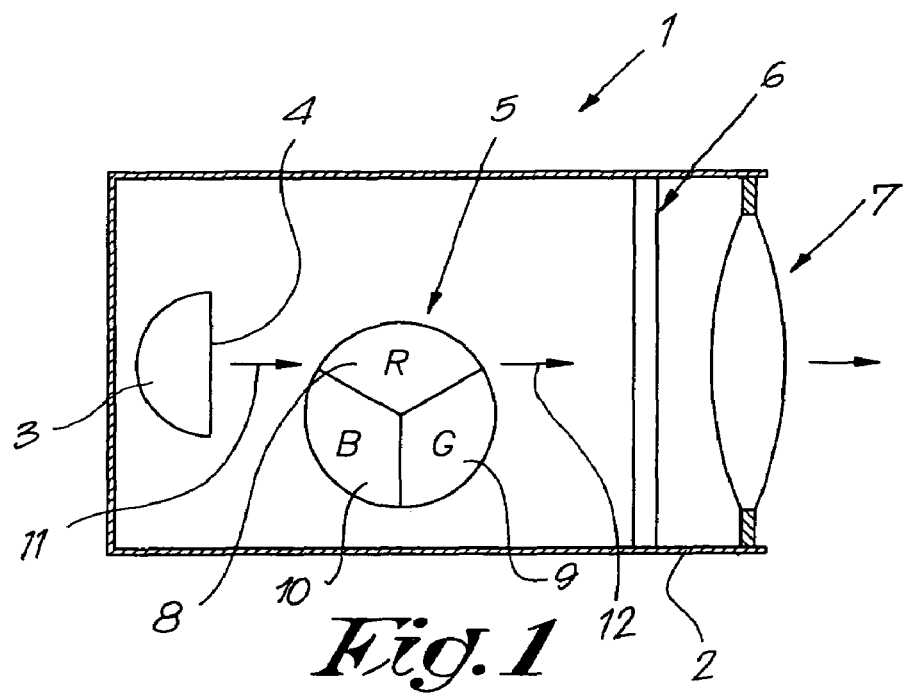
FIG. 1 schematically represents a lighting device according to the invention.
Figure 2:
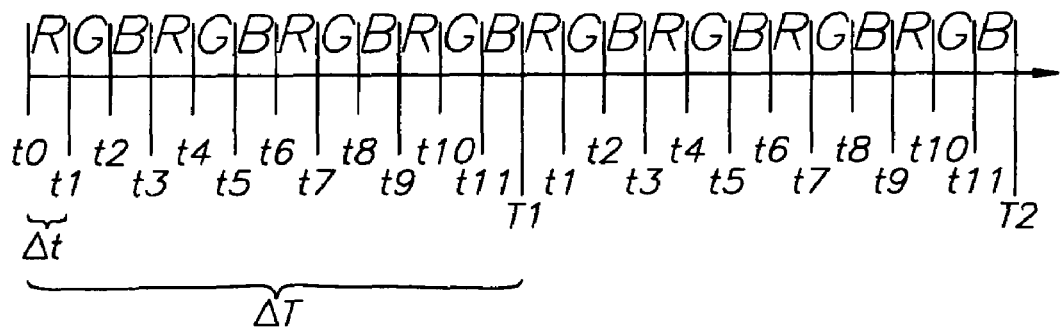
FIG. 2 shows a time table of image building according to the invention.

FIG. 1 represents a lighting device 1 that mainly consists of a housing 2 wherein a light source 3 is provided, the housing 2 having a light gate 4 in front of which a color sequential device 5, a digital light valve 6 and a lens 7 are provided.

The housing 2 is preferably mounted on a standard by means of a ball and socket joint that is not shown in the figures and that allows to swing the lighting device in view of the standard.

The light source 3 can be any known light source such as a high pressure xenon lamp, a metal halide lamp or the like.

Said color sequential device 5 is in this case a rotating color disc that is divided in at least three sections 8, 9 and 10, each encompassing a different color filter, in particular a red, a green and a blue color filter.

It is clear, however, that also other color filters 8-10 may be applied and that it is also possible to make use of a color disc being divided in a larger number of sections each comprising a sequence of RGB filters.

The digital light valve 6 preferably consists of a digital micro-mirror device (DMD) well known in the art.

Such a DMD contains array light processing elements, in particular micro-mirrors that can all switch individually between at least two positions, namely an off-screen and an on-screen position, which positioning of the mirror is controlled by bits.

In order to project an image with the above described lighting device 1, a light beam 11 is emitted by said light source 3 and filtered by the color sequential device 5, resulting in a colored light beam 12 that is subsequently processed by the digital light valve 6.

The color disc is hereby rotated around its axis such that the color filters are sequentially situated in front of the light source, thereby coloring the light beam 11.

The speed of rotation should hereby be chosen to be such that all color filters 8-10 subsequently are positioned in front of the light source in a period that is at maximum ⅓ of the human perception time of vision $\Delta T$, and preferably even equal or less than a quarter of $\Delta T$, as is shown in FIG. 3.

The time $\Delta t$ between the switching of the colored beam between two colors is in this case about 1/12 of $\Delta T$.

This means that during a time period $\Delta t$, the light valve will have to process a single colored light beam 12 corresponding to one image, whereby, as said in the introduction, the micro-mirrors will have to shift between an on-screen and an off-screen position in a certain sequence so that the colored light beam is projected on the screen during a certain fraction of time $\Delta t$.

According to the present invention the number of bits used to program said shifting of the micro-mirrors in a time $\Delta t$ is limited to less than 16 and preferably 12.

In other words, the bit depth of the program used to control the micro-mirrors is lower than 16 and preferably 12, which implies that each micro-mirror may shift between on-and off-screen positions 12 times during a time $\Delta t$.

It is clear that the smaller the bit depth, the less precise the time can be controlled for which a specific mirror should be in a on-screen or off-screen position and thus the less precise a color can be projected on the screen.

In order to assure quality, the applicant researched the minimum bit depth that should be allowed without an average observer to notice color fading.

From these researches a bit depth of more than 8 has been set forth.

The present invention is by no means limited to the above described embodiments given as an example and represented in the accompanying drawings; on the contrary, such method for controlling a lighting device can be realised in all sorts of variants while still remaining within the scope of the present invention.

The invention claimed is:

1. A method for reducing color break up occurring in an image projected by a light device moving during operation, wherein the light device includes at least a lighting source, a color sequential device and a single light valve comprising an array of light processing elements that are controlled by bits, comprising the steps of:
    emitting a light beam with said light source;
    filtering said light beam by said color sequential device to achieve a colored light beam with said light valve; and
    processing said colored light beam, wherein in each light processing element is controlled with a bit depth of less than 16 in a period between two color changes of the colored light beam.

2. The method according to claim 1, wherein the bit depth is greater than 8.

3. The method according to claim 1, wherein the bit depth is equal to 12.

4. The method according to claim 1, wherein the single light valve is a digital micro-mirror device.

5. The method according to claim 1, wherein the color sequential device is a rotating disc comprising at least one red, green and blue filter.

* * * * *